United States Patent [19]

Stoner, Jr.

[11] Patent Number: 4,790,586
[45] Date of Patent: Dec. 13, 1988

[54] COLLAR FOR HAND TOOLS
[75] Inventor: John M. Stoner, Jr., Middletown, Pa.
[73] Assignee: Emhart Industries, Inc., Farmington, Conn.
[21] Appl. No.: 117,188
[22] Filed: Nov. 4, 1987
[51] Int. Cl.$^4$ .......................... A01B 1/22; B25G 3/02
[52] U.S. Cl. ................................................ 294/57
[58] Field of Search .................. 294/57, 49, 54.5, 55, 294/55.5; 16/110 R, 116 R, DIG. 18, DIG. 19, DIG. 24; 36/109, 111, 113; 81/20, 22, 177.1, 489, 492; 172/371, 378, 380, 381; 403/265, 266, 267, 268, 269, 244, 263

[56] References Cited

U.S. PATENT DOCUMENTS 1,662,500  3/1928  Henneck .............................. 294/57

FOREIGN PATENT DOCUMENTS 641210  1/1937  Fed. Rep. of Germany ........ 294/57

Primary Examiner—James B. Marbert
Attorney, Agent, or Firm—Barry E. Deutsch

[57] ABSTRACT

A molded plastic collar for use on hand tools of the type having an elongated socket to receive a tool handle includes an outer wall defined by first and second tapered surfaces extending lengthwise respectively from each end of the collar towards the middle thereof to form relatively thin wall portions at each end and a relatively thick wall portion at the interface of the first and second tapered surface. The inner wall of the collar is defined by a first relatively large diameter section and a second section defined by a relatively small diameter section. The interface of the first and second sections define a radially extending flange-like surface. The end of the socket engages the flange-like surface. The relatively large diameter section of the inner wall overlays the outer wall of the socket and the relatively small diameter section of the inner wall overlays the outer wall of the tool handle.

2 Claims, 3 Drawing Sheets

COLLAR FOR HAND TOOLS

BACKGROUND OF THE INVENTION

This invention relates to hand tools such as shovels, rakes, and the like, and in particular, to a collar comprising a molded plastic body encompassing the socket-handle interface.

Hand tools such as shovels, rakes, and the like typically include a socket portion extending from the tool head for receiving the tool handle. Some handles are formed with shoulders towards one end thereof for mating with the end of the socket to provide a generally smooth transition at the socket-handle point of attachment or interface. Other handles are generally uniformly tapered along their entire length whereat the end of the socket forms a generally flange-like surface at the socket-handle interface. This abrupt transition between the handle and socket, besides not being aesthetically pleasing, also forms a moisture collecting surface which can result in corrosion of the socket.

Accordingly, it is an object of this invention to suitably encompass the interface of the socket-handle so that the socket-handle transition is aesthetically pleasing and in addition corrosion resistant.

SUMMARY OF THE INVENTION

The foregoing object and other objects of the invention are attained in a collar for use on hand tools of the type having an elongated socket to receive a tool handle, said collar comprising a molded plastic body having an outer wall defined by a first tapered portion extending lengthwise of the body from one end toward the middle thereof and a second tapered portion extending lengthwise of the body from the other end towards the middle thereof to form relatively thin wall portions at each end of said body and a relatively thick wall portion at the interface of said first and second tapered portions; the inner wall of the collar being defined by a first relatively large diameter section and a second relatively small diameter section, with the interface of said first and second sections defining a radially extending flange-like surface, with the end of the socket engaging the flange-like surface, the relatively large diameter section of the inner wall overlying the outer wall of the socket and the relatively small diameter section of the inner wall overlying the outer wall of the tool handle.

DESCRIPTION OF THE PREFERRED EMBODIMENT

Figure 1:
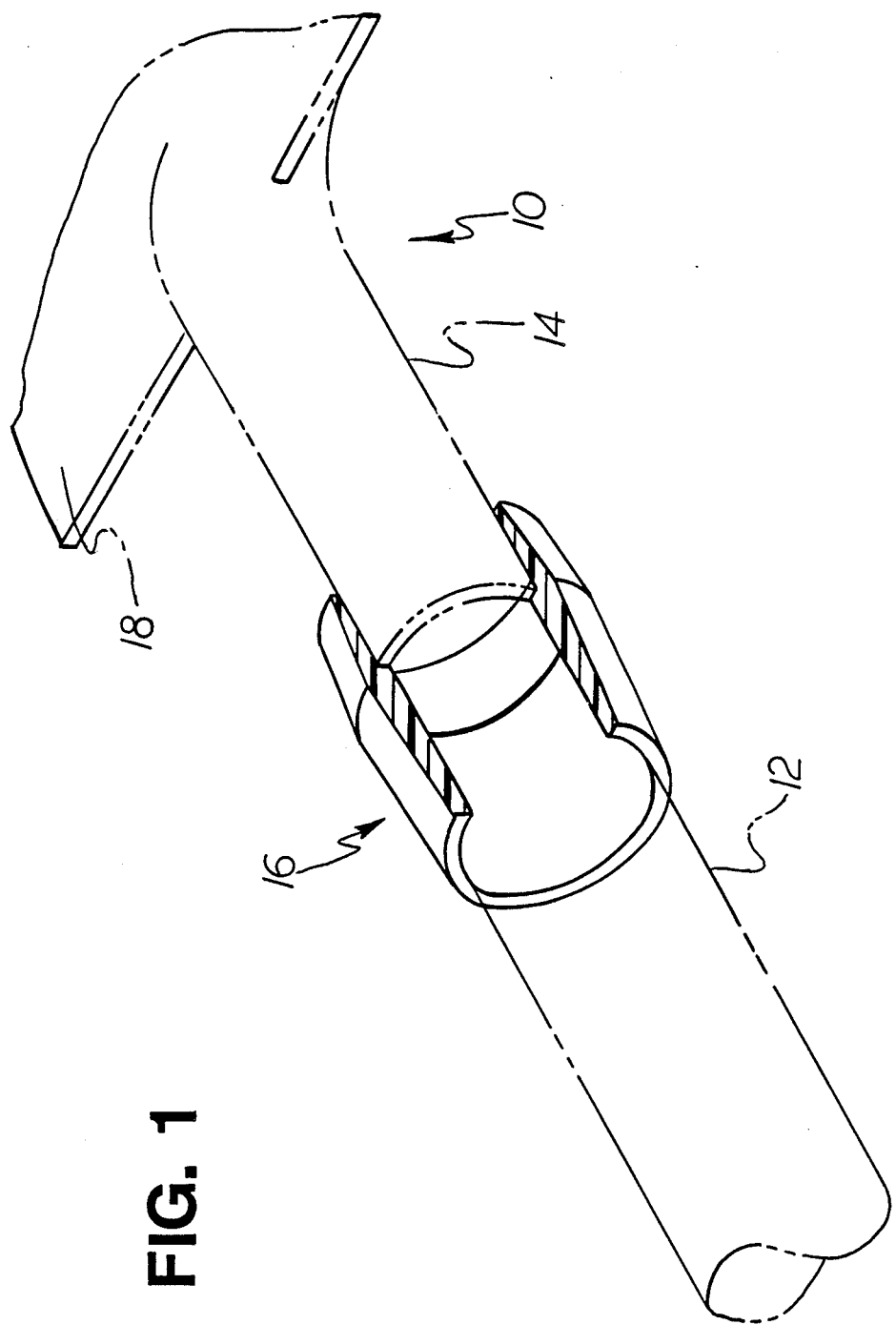
FIG. 1 is a perspective view, partially in section, illustrating the invention as employed on a hand tool.

Referring now to drawing, there is disclosed a preferred embodiment of the present invention. In referring to the various Figures of the drawing, like numerals shall refer to like parts.

Hand tool 10, such as a shovel, rake, or the like, generally includes a socket portion 14 formed integral with the tool head, such as blade 18 of a shovel. Handle 12 of hand tool 10 is secured within socket 14 as is well known to those skilled in the art. Handle 12 may include a stepped portion at the end which engages the socket to provide a rather smooth transition from the outer wall of the handle to the outer wall of the socket. Alternatively, handle 12 may be uniformly tapered from one end to the other which results in a rather abrupt transition from the outer wall of the handle to the outer wall of the socket. In fact, since the diameter of the socket is somewhat greater than the diameter of the handle at the point of attachment, the end of the socket defines a radially inwardly extending flange-like surface. It has been found that such radially inwardly extending surface is not aesthetically appealing and more importantly, may act as a moisture collecting surface. The moisture collected at the surface causes corrosion and reduces the useful life of the hand tool.

The present invention overcomes the prior art defects by providing an aesthetically appealing transition from the tool handle to the tool socket and in addition eliminates the moisture collecting surface which results in the hand tool being more resistant to corrosion.

The present invention comprises a collar 16 formed from a suitable plastic material such as polyvinyl chloride such as manufactured by B. F. Goodrich Company and sold under the product designation Geon 83008. Other suitable plastic material may be substituted for the polyvinyl chloride material used in the preferred embodiment. Collar 16 includes a first tapered portion 20 extending lengthwise of the body of the collar from one end towards the middle. Collar 16 further includes a second tapered portion 22 extending lengthwise of the collar body from the other end of the collar towards the middle thereof. Portion 20 defines the outer surface of a relatively thin wall section 34. Likewise portion 22 forms the outer surface of a relatively thin wall portion 32. The interface 24 of tapered portions 20 and 22 define a relatively thick wall portion 24.

The inner wall of the collar is partially defined by a first relatively large diameter section 28 and a second relatively small diameter section 26. The interface of the first and second sections 26 and 28 define a radially extending flange-like surface 30. The end of socket 14 rests against flange-like surface 30 as illustrated in FIG. 2.

Small diameter section 26 terminates in a radially extending flange-like surface 35. The distance between inner edge 38 and outer edge 36 of surface 35 is approximately 0.05 of an inch. Similarly large diameter section 28 terminates in a flange-like surface 33. The distance between the inner and outer edges respectively 42 and 40 of surface 33 is also approximately 0.05 of an inch.

Figure 2:
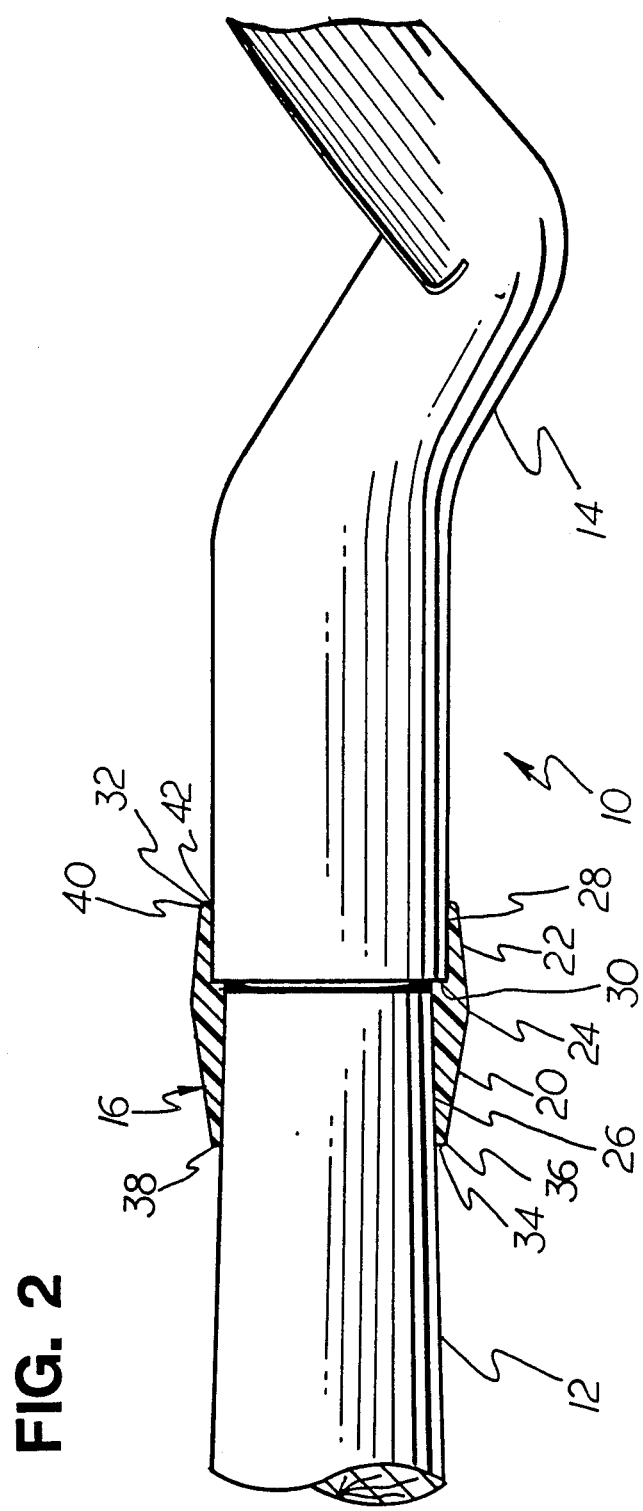
FIG. 2 is an elevation view, with the collar of the present invention taken in section.
Figure 4:
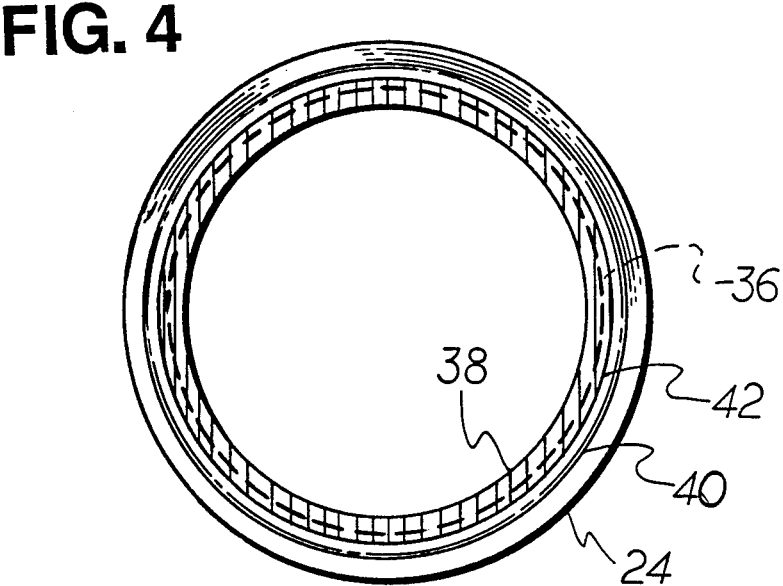
FIG. 4 is an end view of the collar, taken from the socket end thereof.
Figure 3:
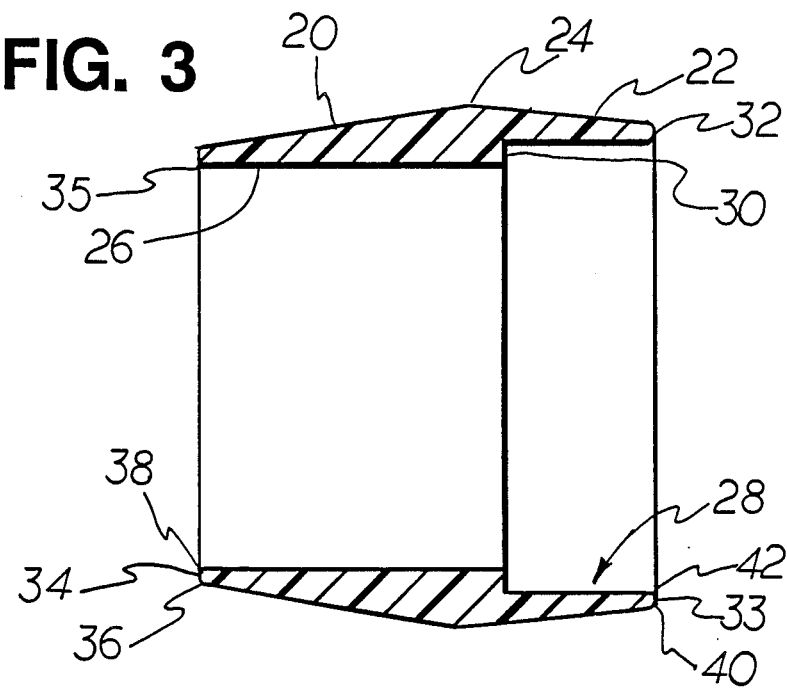
FIG. 3 is a sectional view of the collar of the present invention illustrating details thereof.

As illustrated in FIGS. 1 and 2, collar 16 encompasses the interface between handle 12 and socket 14. Since the walls of the collar taper outwardly from each end towards the middle of the collar, the transition between the socket and handle is not abrupt but rather becomes aesthetically pleasing. In addition, as collar 16 is formed from plastic material, and the collar encompasses the interface between the handle and socket, the radially extending flange of the socket is consequently covered by the collar. Since the collar is waterproof, the foregoing results in an increase to the corrosion resistance of the tool.

The plastic material used to manufacture collar 16 is also somewhat resilient. Thus, the inner wall of the collar will conform to any irregularities on the outer wall of the socket to maintain the integrity of the waterproof enclosure about the handle-socket interface.

While a preferred embodiment of the present invention has been described and illustrated, the invention should not be limited thereto, but may be otherwise embodied within the scope of the following claims:

I claim:

1. A collar for use on hand tools of the type having an elongated socket to receive a tool handle, said collar comprising a molded plastic body having an outer wall defined by a first tapered portion extending lengthwise of the body from one end towards the middle thereof and a second tapered portion extending lengthwise of the body from the other end towards the middle thereof to form relatively thin wall portions at each end of said body and a relatively thick wall portion at the interface of said first and second tapered portions, with the inner wall of the collar being defined by a first relatively large diameter section and a second relatively small diameter section, with the interface of said first and second sections defining a radially extending flange-like surface, with the end of the socket engaging the flange-like surface, the relatively large diameter section of the inner wall overlying the outer wall of the socket and the relatively small diameter section of the inner wall overlying the outer wall of the tool handle.

2. A collar as defined in claim 1 wherein the surface defining the first section of the inner wall conforms to irregularities in the outer surface of the socket.

* * * * *